US008385525B2

(12) United States Patent
Szczepanek (10) Patent No.: US 8,385,525 B2
(45) Date of Patent: Feb. 26, 2013

(54) INTERNET ACCESSED TEXT-TO-SPEECH READING ASSISTANT

(76) Inventor: Noah John Szczepanek, Washington, DC (US)

( * ) Notice: Subject to any disclaimer, the term of this patent is extended or adjusted under 35 U.S.C. 154(b) by 917 days.

(21) Appl. No.: 11/430,859

(22) Filed: May 10, 2006

(65) Prior Publication Data

US 2006/0271627 A1 Nov. 30, 2006

Related U.S. Application Data

(60) Provisional application No. 60/681,350, filed on May 16, 2005.

(51) Int. Cl.
*H04M 3/42* (2006.01)

(52) U.S. Cl. ............. 379/201.01; 379/88.13; 379/88.17; 379/88.23; 379/93.03; 455/414.1; 705/26.1; 705/28; 705/30; 705/307; 705/326; 709/203; 709/217; 709/220; 709/228; 709/229

(58) Field of Classification Search .................. 717/168, 717/172–173; 370/259–271, 351–356; 709/201–207, 217–248; 379/67.1–88.28, 379/90.01–101.01, 111–114.14, 201.01; 455/405–420, 426.1, 426.2, 461–466, 550.1–560; 704/270–278
See application file for complete search history.

(56) References Cited

U.S. PATENT DOCUMENTS

| 5,035,625 | A | * | 7/1991 | Munson et al. ................ 434/332 |
| 5,845,065 | A | * | 12/1998 | Conte et al. ...................... 726/31 |
| 5,930,357 | A | * | 7/1999 | Fukui .............................. 705/59 |
| 5,953,532 | A | * | 9/1999 | Lochbaum ..................... 717/176 |
| 6,014,134 | A | * | 1/2000 | Bell et al. ....................... 715/705 |
| 6,023,763 | A | * | 2/2000 | Grumstrup et al. .............. 726/28 |
| 6,035,404 | A | * | 3/2000 | Zhao ................................... 726/6 |
| 6,195,432 | B1 | * | 2/2001 | Takahashi et al. ............. 380/277 |
| 6,311,209 | B1 | * | 10/2001 | Olson et al. .................... 709/204 |
| 6,678,824 | B1 | * | 1/2004 | Cannon et al. ................... 726/22 |
| 6,889,212 | B1 | * | 5/2005 | Wang et al. ...................... 705/59 |
| 6,901,386 | B1 | * | 5/2005 | Dedrick et al. .................. 705/59 |
| 6,959,291 | B1 | * | 10/2005 | Armstrong et al. ............. 705/59 |
| 7,069,293 | B2 | * | 6/2006 | Cox et al. ....................... 709/203 |
| 7,243,346 | B1 | * | 7/2007 | Seth et al. ...................... 717/163 |
| 7,437,457 | B1 | * | 10/2008 | Eisendrath et al. ........... 709/225 |
| 7,457,781 | B1 | * | 11/2008 | Weaver et al. ................... 705/64 |
| 7,574,442 | B2 | * | 8/2009 | Takeda et al. ......................... 1/1 |
| 7,631,013 | B2 | * | 12/2009 | Parsons et al. ........................ 1/1 |
| 2002/0013940 | A1 | * | 1/2002 | Tsukamoto et al. ............. 725/5 |
| 2002/0091723 | A1 | * | 7/2002 | Traner et al. ................... 707/205 |
| 2002/0091936 | A1 | * | 7/2002 | Tema ............................. 713/200 |
| 2002/0138441 | A1 | * | 9/2002 | Lopatic ........................... 705/59 |
| 2003/0027121 | A1 | * | 2/2003 | Grudnitski et al. ........... 434/308 |
| 2003/0032406 | A1 | * | 2/2003 | Minear et al. ................. 455/410 |
| 2003/0120557 | A1 | * | 6/2003 | Evans et al. ..................... 705/26 |
| 2003/0145316 | A1 | * | 7/2003 | McKinlay et al. ............. 717/173 |
| 2003/0172035 | A1 | * | 9/2003 | Cronce et al. ................... 705/59 |
| 2003/0221112 | A1 | * | 11/2003 | Ellis et al. ...................... 713/189 |
| 2004/0033475 | A1 | * | 2/2004 | Mizuma et al. ................ 434/219 |
| 2004/0128250 | A1 | * | 7/2004 | Fox et al. ......................... 705/52 |
| 2004/0148525 | A1 | * | 7/2004 | Aida et al. ...................... 713/201 |
| 2004/0267590 | A1 | * | 12/2004 | Clark et al. ........................ 705/9 |
| 2005/0003330 | A1 | * | 1/2005 | Asgarinejad et al. .......... 434/20 |

(Continued)

*Primary Examiner* — Hemant Patel
(74) *Attorney, Agent, or Firm* — Symbus Law Group, LLC; Clifford D. Hyra (57) ABSTRACT

An Internet accessed server that on demand downloads and activates text-to-speech program elements to a subscriber's computer. Program elements are customized to match the operating system of the subscriber's computer. Upon termination of the text-to-speech session, the server deactivates all program elements and the subscriber becomes free to reinitiate over the Internet the text-to-speech program on the same or another computer system.

25 Claims, 8 Drawing Sheets

U.S. PATENT DOCUMENTS

| | | |
|---|---|---|
| 2005/0044546 A1* | 2/2005 | Niebling et al. ............... 717/177 |
| 2005/0132347 A1* | 6/2005 | Harper et al. ................. 717/168 |
| 2005/0158697 A1* | 7/2005 | Nelson et al. ................. 434/350 |
| 2005/0227216 A1* | 10/2005 | Gupta ........................... 434/322 |
| 2006/0141439 A1* | 6/2006 | Chang et al. .................. 434/350 |
| 2007/0127650 A1* | 6/2007 | Altberg et al. ............ 379/114.13 |
| 2008/0243991 A1* | 10/2008 | Ryan et al. ..................... 709/203 |
| 2009/0187995 A1* | 7/2009 | Lopatic ........................... 726/31 |

* cited by examiner

INTERNET ACCESSED TEXT-TO-SPEECH READING ASSISTANT

CROSS-REFERENCE TO RELATED APPLICATIONS

This application claims the benefit of provisional patent application Ser. No. 60/681,350, filed 2005 May 16 by the present inventor.

FEDERALLY SPONSORED RESEARCH

Not Applicable

SEQUENCE LISTING OR PROGRAM

Not Applicable

BACKGROUND OF THE INVENTION

1. Field of Invention

The present invention relates generally to the field of computer software systems and, more particularly, to an internet system providing a service to subscribers in which a server delivers as requested text-to-speech capabilities to the subscriber's computer.

2. Prior Art

Advances in computer technology have generated exceptional software systems providing fast text-to-speech algorithms that faithfully synthesize audio renditions of text materials suited to the requirements of many people. Programs such as the Kurzweil Reading system (6199042), the web based WYNN Wizard and TextAloud are examples of these programs. The teaching environment, in particular, could profit by widespread use of this technology. People learn best using multiple sensory inputs and these systems not only present the text as a visual stimulus but present the audio rendition as an additional stimulus. This combination strongly focuses the reader's attention on the material and can provide a much steadier reading and comprehension rate. The current programs are installed on stand-alone computer systems connected to a peripheral reader or scanner device and are not conveniently portable between computers or computer systems. The current programs have a high up-front cost. Except for some installed individual reading stations and a few individual computer readers, the technology has not proliferated in teaching situations as it could have been expected to because of the cost of licensing and installing reading programs on the different computers used by a student in the classroom, in the library or at his home. Neither is there a convenient method of coordinating or organizing teaching or training group projects or interactive projects with such individual based systems. Because of these impediments, the text-to-speech technology has made no impact in teaching, neither for the disabled or dyslexic student nor for the mainstream student or trainee in spite of the fact that computers, both desk and laptops, are ubiquitous in and around the classroom.

OBJECTS AND ADVANTAGES

The disadvantages and problems associated with current techniques have been substantially reduced or eliminated by the Internet Accessed Text-To-Speech Reading Assistant.

In view of the above, the present invention is advantageous in that it allows an Internet accessed server that distributes or downloads text-to-speech program elements to a subscriber's computer and conditionally activates the programs upon a subscriber's request. This feature provides ready entree to the useful capabilities of text-to-speech programs for all subscribers with Internet access. The text-to-speech program algorithms are downloaded and, through subscriber control, locally process the text-to-speech session. The programs are customized to the operating system of the computer on which the subscriber logged onto the server. This feature provides complete portability of the text-to-speech capability independent of the location of the subscriber (e.g. classroom, library, home, away from home) or of the type of computer system (e.g. Mac, PC, etc.) on which the subscriber is working.

The Reading Assistant is advantageous in that upon session completion, the text-to-speech program is deactivated on the computer platform used by the subscriber. The text and position at which the text-to-speech is terminated is recorded as a bookmark by the server and the subscriber is logged off the system. This insures that only one computer is activated at any given time by a single subscriber. In the case where the computer is not registered by a subscriber or a subscriber group, the program elements are also de-installed from the computer at the end of the session. This feature insures that the text-to-speech software does not clutter the memory facilities of unregistered computers. Because the program elements remain installed on registered computers, only program activation has to be accomplished in any subsequent sessions saving time and bandwidth. Because of current high speed internet connections, the additional time required to reinstall program elements on non-registered computers presents only a slight increase in access time.

The Reading Assistant is advantageous in that the subscriber, whose status is off, can subsequently request another text-to-speech session through the Internet system server on the same or any other computer platform and resume with the last partially read text or with new material as desired. The use of the system is completely portable with regard to place and computer. For groups of subscribers (e.g. a classroom of students, a class of trainees, etc) prescribed reading material (i.e. teacher's lesson plan) can be stored on the server and be available to student at the most convenient computer available. Student reading progress could also be available to the teacher. All aids to the understanding of the material, Dictionaries, Thesaurus and even translation into other languages can be available to act on subscriber highlighted words in the text. Other features will also be available allowing participant to notate specific sections of the reading material for future reference, to take notes on the reading material and have available a spell and grammar checker to aid in this process. The service cost for the Reading Assistant is based on a per subscriber fee and not on a per computer license fee and because subscriber activation times are likely to be much less than 100%, software license fee can be shared.

Other aspects and advantages of the Reading Assistant will become apparent from the following description and accompanying drawings.

SUMMARY

In accordance with the present invention an internet system provides a service to subscribers in which a server delivers as requested text-to-speech capabilities to a subscriber's computer.

DRAWINGS—FIGURES

For a more complete understanding of the present invention, reference is made to the following drawings, in which:

FIG. 4 illustrates the flow chart of activities within the server during subscriber log-in;

DRAWINGS—REFERENCE NUMERALS

| | |
|---|---|
| 100 | subscriber interface |
| 110 | computer |
| 115 | display |
| 120 | text scanner |
| 125 | text reader |
| 130 | speaker |
| 135 | headphones |
| 140 | internet access |
| 150 | printer |
| 200 | internet |
| 300 | server |
| 310 | agent |
| 311–334 | program logic elements |
| 350 | home page |
| 351–359 | home page sections |
| 360 | subscriber data file |
| 370 | plug-in module file |
| 370A–370G | plug-in modules |
| 380 | e-text library |
| 390 | lesson library |

DETAILED DESCRIPTION—PREFERRED EMBODIMENT_FIGS. 1, 2, 3

Figure 1:
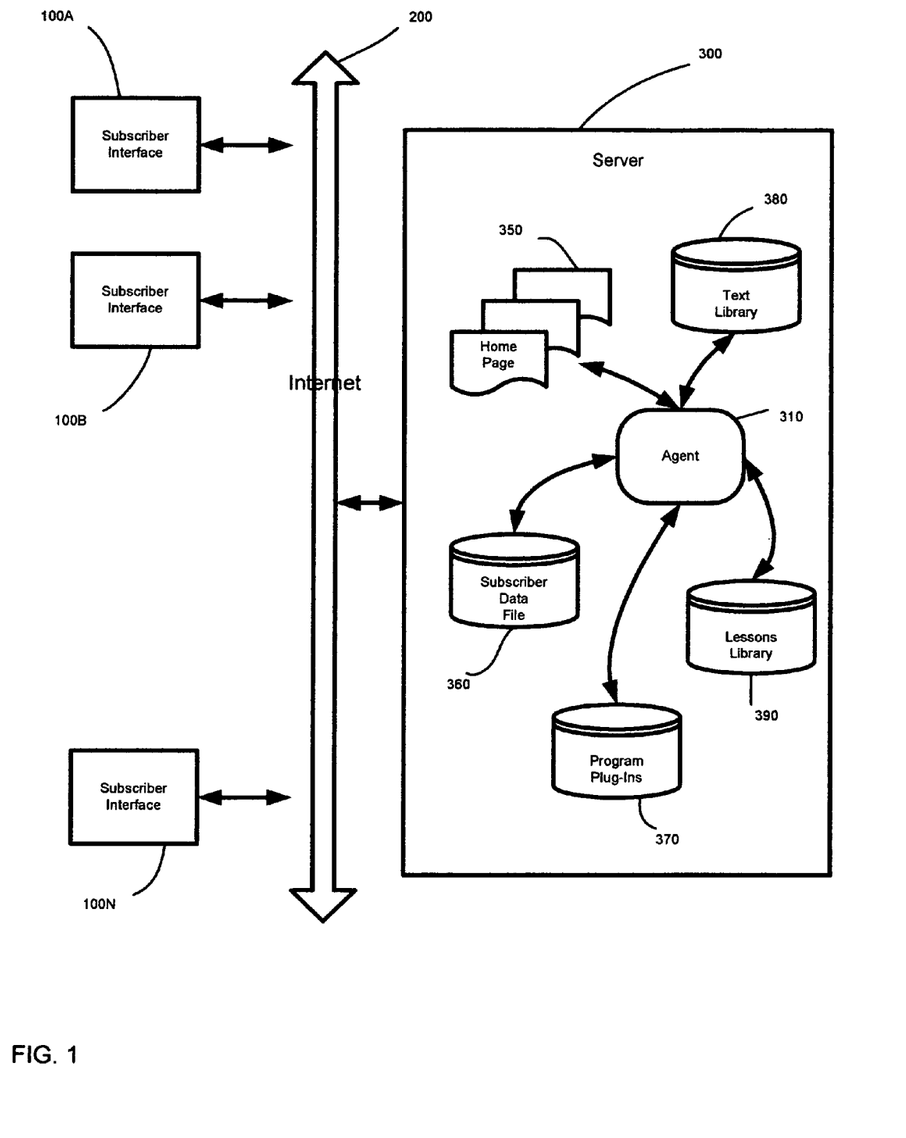
FIG. 1 illustrates a network system, including a server, the Internet connection and at least one subscriber interface according to an embodiment of the present invention.
Figure 2:
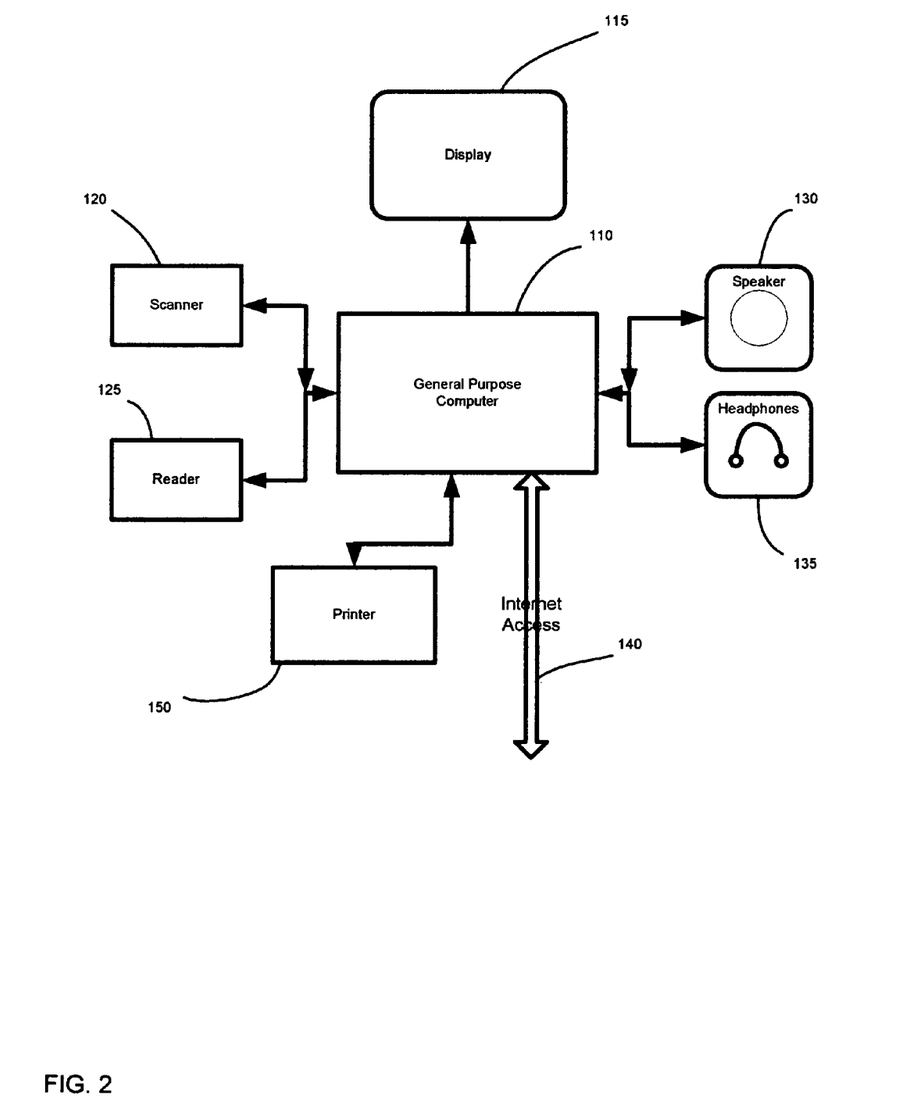
FIG. 2 illustrates a subscriber interface.
Figure 3:
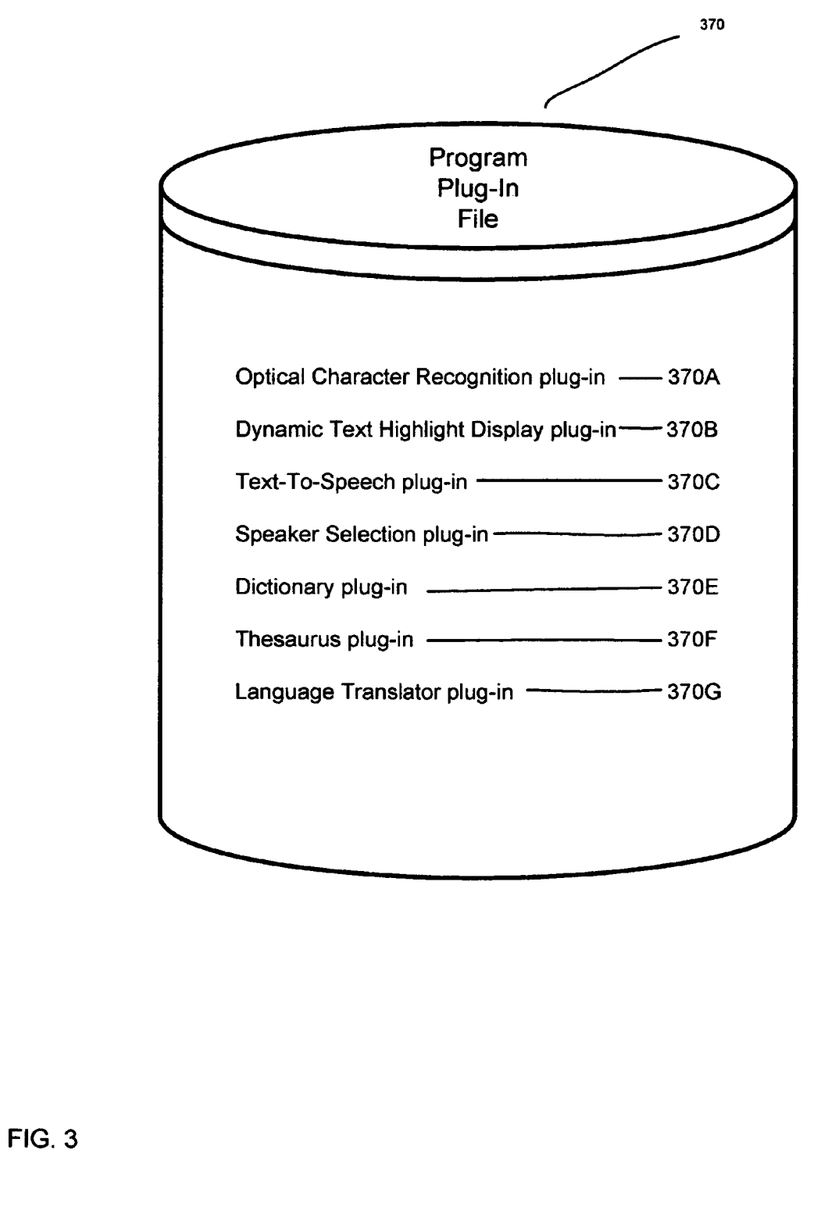
FIG. 3 illustrates the variety of program plug-in modules.
Figure 4:
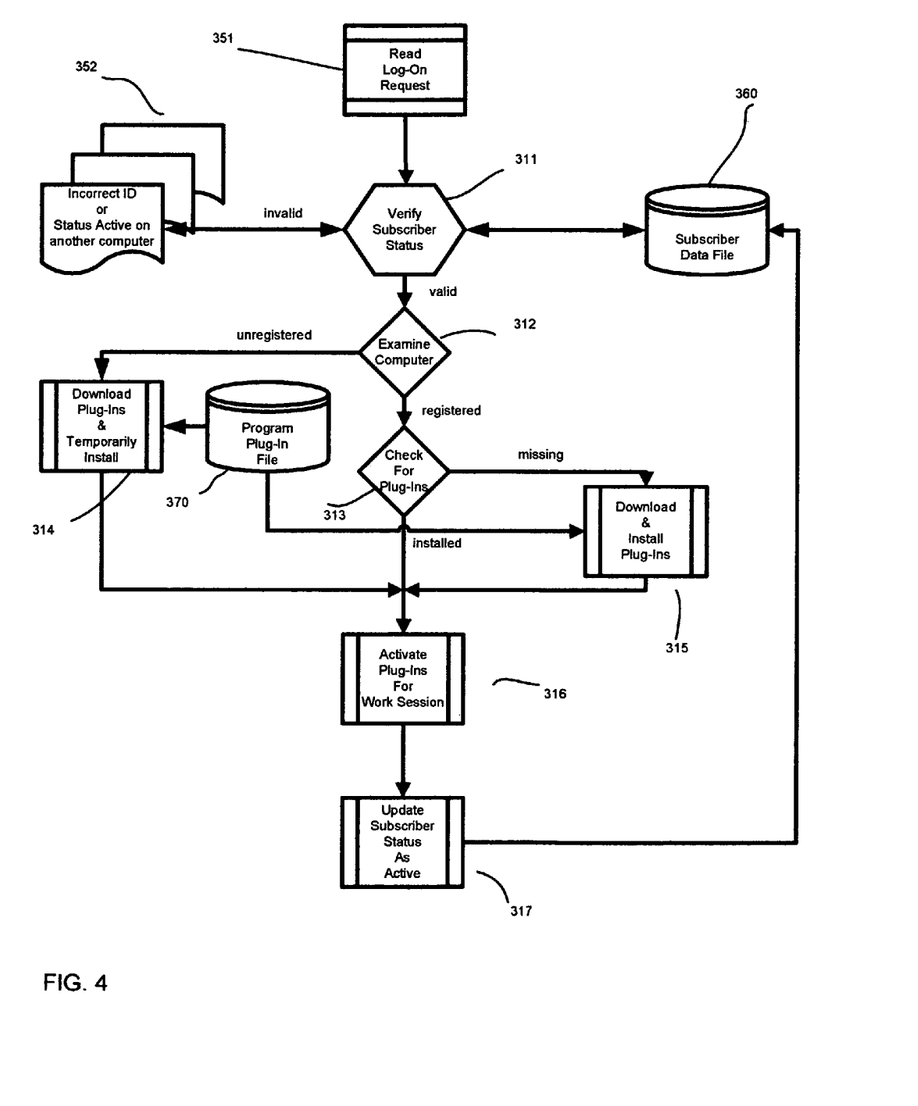

The preferred embodiment of the Reading Assistant is best understood with reference to FIGS. 1-3 of the drawings. FIG. 1 details the connectivity of the server 300 and the subscriber interfaces 100A, . . . , 100N via the internet 200.

The server 300 supports all active subscribers, validating each subscriber and logging the subscriber on and off the system, provisioning each subscriber's computer with compatible text-to-speech software, activating the software for a predetermined work period, and providing requested text or lessons.

The internet 200 provides bidirectional communication between the subscribers 100A, . . . , 100N and the server 300. The internet 200 provides adequate capacity, as those versed in the art can appreciate, to support thousands of active subscribers.

The server 300 includes an agent 310, a home page 350, subscriber data file 360, plug-in module file 370, E-text library 380, and lesson library 390. The agent 310 is the software that coordinates all required server functions. The home page 350 facilitates all communications between the subscriber and agent through which log-in is initiated, requests for e-text material or stored lessons are submitted, and work sessions are terminated. Subscriber data file 360, includes all necessary subscriber identification for validation purposes, a list of subscriber registered computers, current subscriber status whether on or off line, and bookmarks for previously requested materials. Plug-in module file 370 includes all text-to-speech plug-in program modules that can be down-loaded and have versions that are compatible with the full array of computers used by the subscriber population enabling all text-to-speech activities on any of these computers. E-text library 380 contains classic books or textbooks in digital format that can be requested by subscribers. Subscriber text-to-speech activities are not limited to these materials; they form only one source of text materials. Any e-text materials, e-mails, web generated text materials, word processor reports, books from other on-line sources, and any scanned materials can serve as a source for the Reading Assistant. The lessons library 390 contains downloadable lesson materials for specific subscriber groups (school classes, training groups) which can be accessed only by members of that particular group.

A more detailed description of a subscriber interface 100 is continued with reference to FIG. 2. The heart of the subscriber system is a general purpose computer 110. The computer can use any of the standard operating systems including Windows XP, Windows 98, MacOS X, Linex, etc. Other essential features include a display 115, internet access 140 which includes a browser, and a speaker 130, and/or headphones 135. Other useful accessories include a text scanner 120 or a text reader 125 and a printer 150. Together, these elements provide the capability of accessing the Reading Assistant server and storing and running the text-to-speech program elements. Further, the audio rendition of text can be heard through the speaker or headphones while the text is displayed and audio portion highlighted on the display. Local sources of text can be scanned or read and hard copies of any of the text can be printed. It should be understood that the programs, processes, methods described herein are but an exemplary implementation of the present invention and are not related, or limited to any particular computer, apparatus, or computer language. Rather, various types of general purpose computing machines or devices may be used with programs constructed in accordance with the teachings described herein.

The composition of the plug-in module file 370 is detailed with reference to FIG. 3. The plug-in module file consists of at least seven program module types, Optical Character Recognition 370A, Dynamic Text and Highlight Display 370B, Text-to-Speech 370C, Speaker Selection 370D, Dictionary 370E, Thesaurus 370F, Language Translator 370G. Each module type consists of distinct programs appropriately configured for the various subscriber operating systems. Each module facilitates a distinct feature of the Reading Assistant. The Optical Character Recognition 370A interprets scanned or reader data in terms of textual characters. The Dynamic Text and Highlight Display 370B formats the text material for display and provides a dynamic word highlighter that follows the progress of the audio rendition of the text. The Text-to-Speech module 370C provides the conversion of the text to its audio rendition. Speaker Selection 370D provides option for choosing characteristics of the speech. The Dictionary 370E, Thesaurus 370F, and Language Translator 370G provide additional tool for understanding of the meaning of the text and performing the recognized features of these tools but, integrated into the display and speech module to allow the subscriber the ability to point to words and both see and hear further information about the word. As those skilled in the art

OPERATION—PREFERRED EMBODIMENT—FIGS. 4, 5, 6, 7, 8

The operation of the Reading Assistant is embodied in the actions of the agent 310. The specific actions of the agent 310 to a subscriber request to log-on to the Reading Assistant are accomplished according to the flow chart detailed in FIG. 4. The request submitted through a section of the home page 351 is read by 310. In the preferred embodiment the subscriber password would be contained on a flash memory device and changed after each completed interaction with the server for enhanced security. The program logic element 311 validates the request using data in the subscriber data file 360, including all subscriber identification and password and the subscriber's current server status. The request is rejected if the subscriber's identification cannot be validated and/or the subscriber's status indicates he is logged onto another computer and report 352 is sent. If the request is deemed valid, logic 312 examines the computer and if unregistered, logic 314 downloads and temporarily installs modules 370A-370G from file 370 on the computer for the duration of a work session. If the subscriber is using a registered computer, logic 313 checks for all plug-ins and logic 315 installs any that are not on the computer. Logic 316 then activates all plug-ins for the time of one work session. A work session is established as one hour. Logic 317 changes the status of the subscriber to active in the file 360. The subscriber's status is an electronic token; if the subscriber is inactive on the server, the subscriber holds the token; if the subscriber is active on the server the server holds the token, preventing the subscriber from logging into the server from another computer. These procedures insure that a subscriber is at most using a single computer system at any time. The set activation time insures that even in the event a machine is left unattended, the programs will automatically deactivate and on unregistered computers will de-install and the subscriber's status will revert to inactive at the expiration of a work session or, in terms of the token, the subscriber's token is returned at the expiration of a work session.

Figure 5:
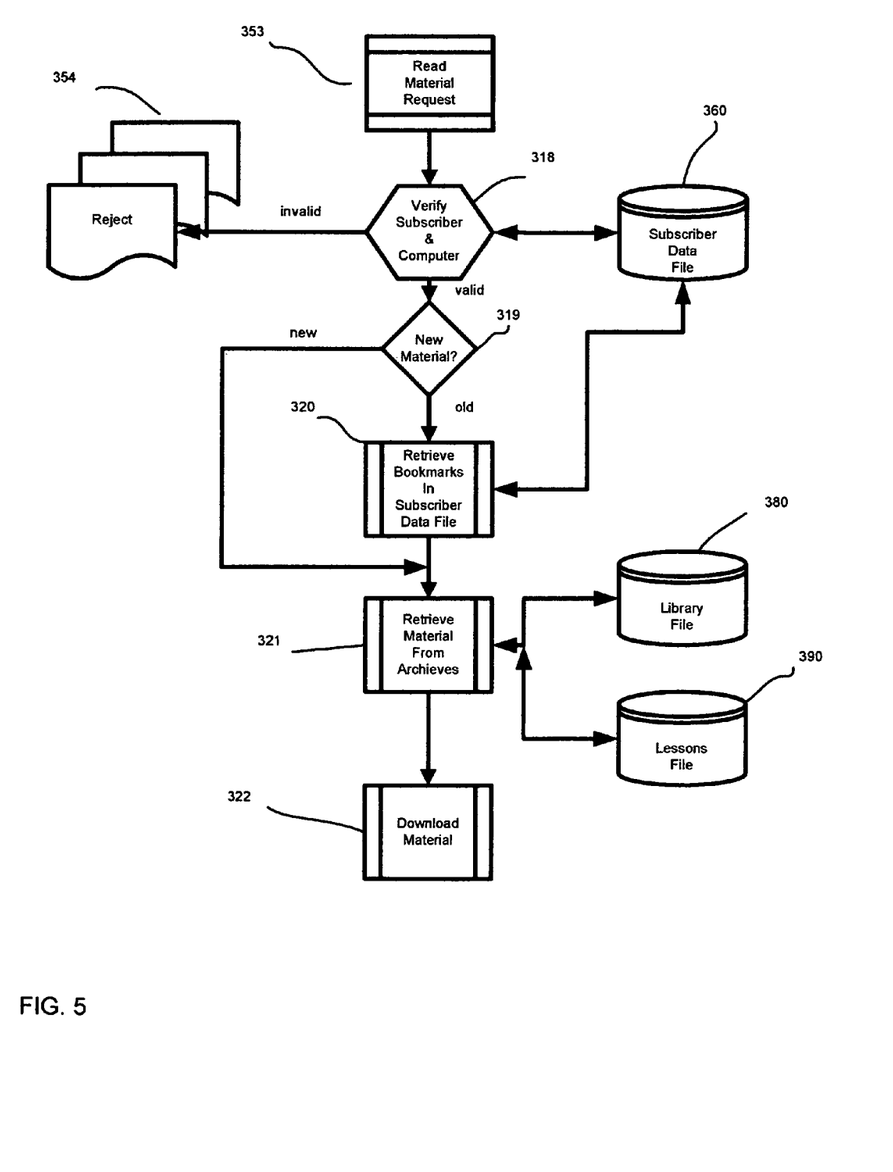
FIG. 5 illustrates the flow chart of activities within the server in response to a subscriber text material request.

Actions of agent 310 are continued with reference to FIG. 5. A subscriber request for text material is accomplished according to the flow chart detailed in FIG. 5. The request submitted via the home page form 353 is read by agent 310. Logic 318 finds verifies subscriber and computer and if invalid, sends rejection 354. Logic 319 finds any stored bookmarks for the material and forwards them through logic 320. The material is retrieved from e-text library 380 or lesson library 390 by logic 321 and downloaded to the subscriber's computer by logic 322. A wide selection of classic reading material, both books and textbooks, are available from the Reading Assistant site and these are stored with both the text and imbedded speech relieving much of the computer processing necessary at the subscriber's computer. All record of reading progress is available within the stored bookmarks as well as progress on lessons.

Figure 6:
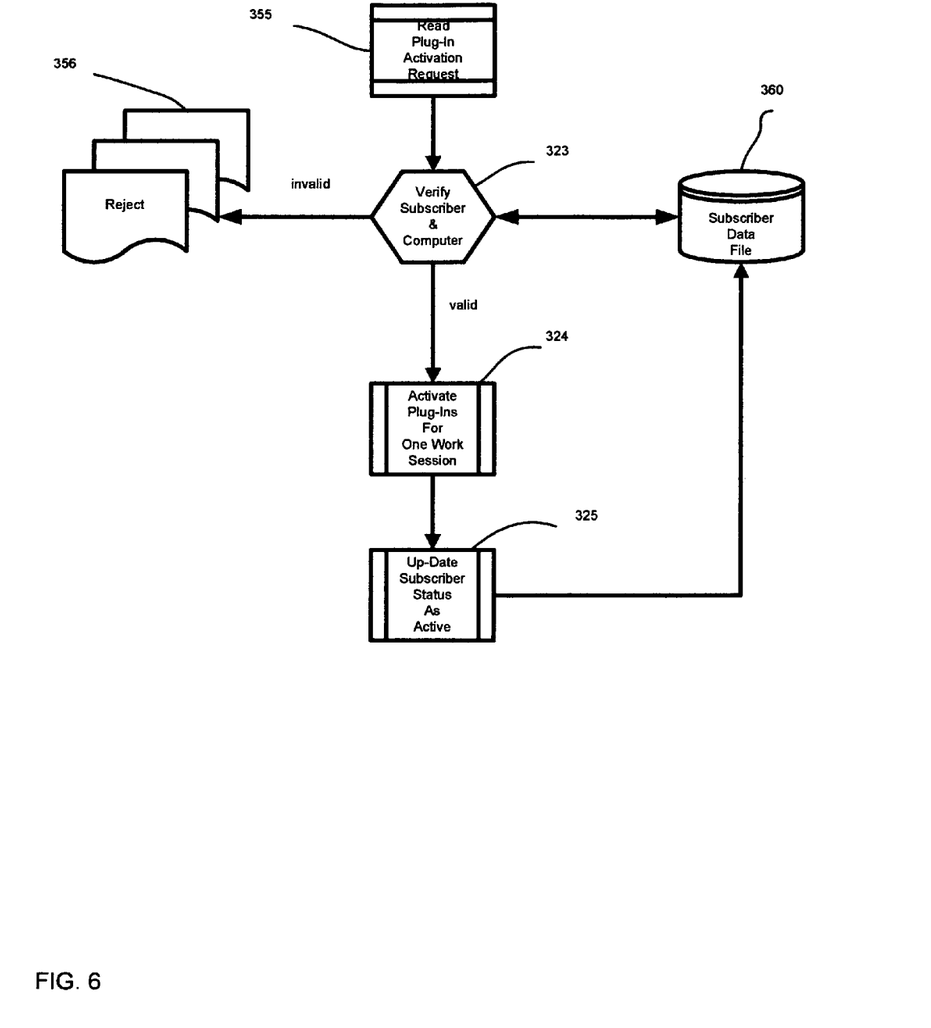
FIG. 6 illustrates the flow chart of activities within the server in response to a subscriber work session extension request.

Actions of agent 310 are continued with reference to FIG. 6. As noted in reference to FIG. 4, plug-ins are activated for one work session. As the end of the session nears, notice is automatically given of the approaching end of the work session and the subscriber can request an activation extension. An activation extension request is acted upon as detailed in the flow chart in FIG. 6. The activation extension is submitted via the home page 355 and read by the agent 310. The subscriber identification and password are compared by logic 323 to the stored combination in the file 360. Unless the request corresponds to the recorded combination, the request is rejected and indicated through the report 356. If the request is accepted, logic 324 activates the plug-ins for an additional work session. This process also retards the process of de-installing the program elements on non-registered computers for an additional work session. Logic 325 then updates the subscriber status in the file 360 as active for an additional time period of one work session. In term of the token, the subscribers token is retained for another work session. This process insures that the subscriber can work with the reading assistant as long as desired yet, even when the subscriber does not properly log off the system, the system will deactivate all plug-in modules, cease operation after the expiration of the work session and sign the subscriber off the system or equivalently, return the subscriber's token.

Figure 7:
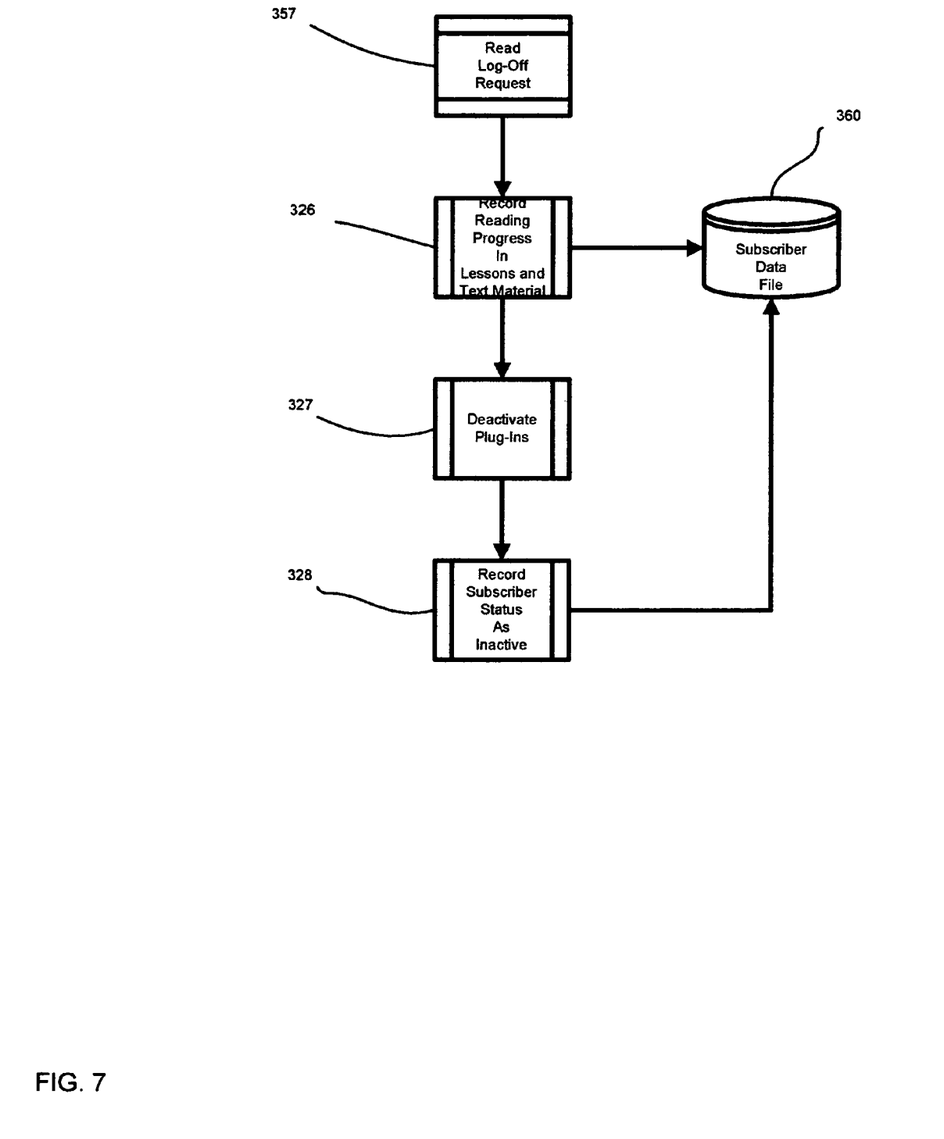
FIG. 7 illustrates the flow chart of activities within the server in response to a subscriber Log-Off request.

Actions of agent 310 are continued with reference to FIG. 7. A subscriber log-off request is acted upon as detailed in the flow chart in FIG. 7. The log-off request is submitted via the home page 357. Logic 326 records in the file 360 reading progress achieved on any subscriber requested text materials and lessons during the work session. Logic 327 deactivates plug-in modules on subscriber registered computers and de-installs plug-in modules on non-registered computers. The subscriber status is updated by logic 328 to inactive in the file 360 or, in terms of tokens, the token is returned to the subscriber.

Figure 8:
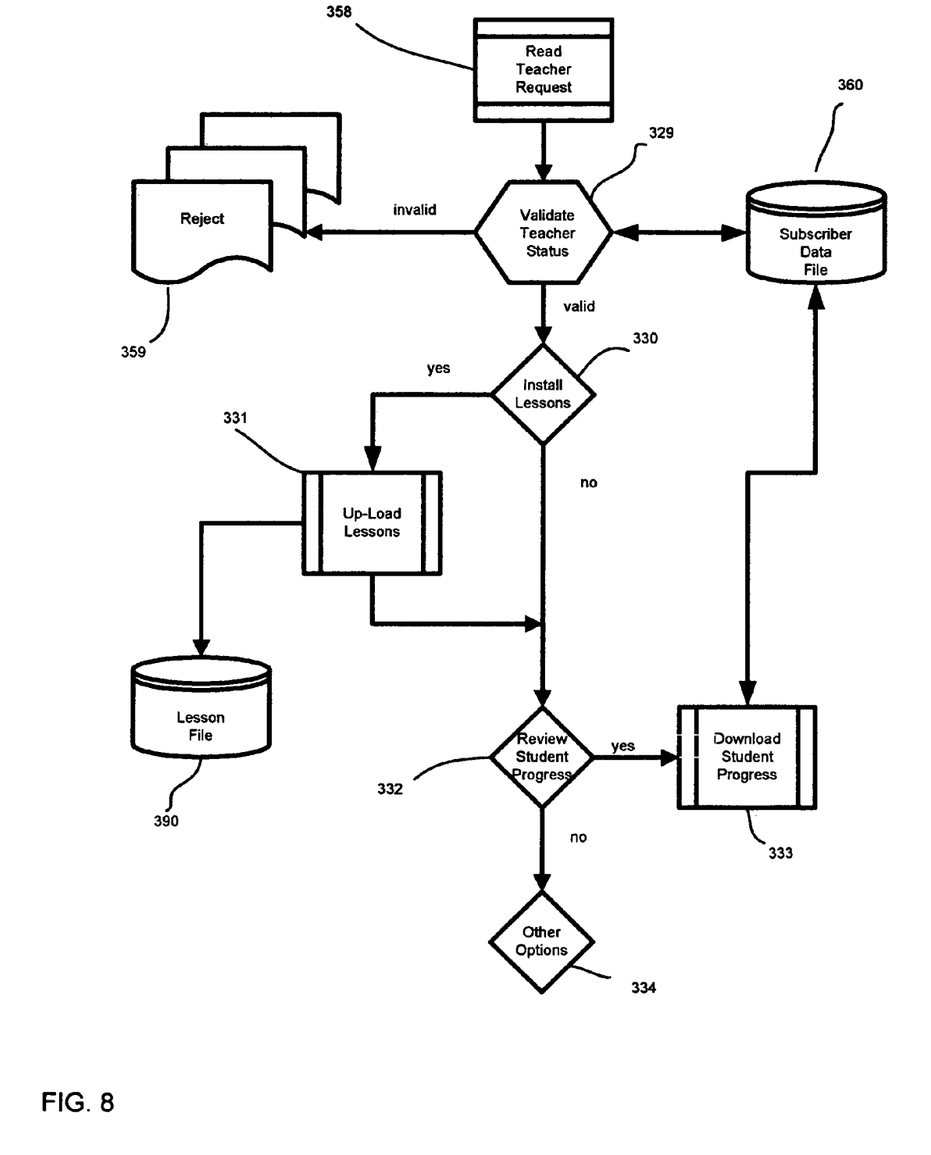
FIG. 8 illustrates the flow chart of activities within the server in response to a subscriber request for teacher options.

Actions of agent 310 are continued with reference to FIG. 8. A subscriber request for teacher options is acted upon as detailed in the flow chart in FIG. 8. The teacher option request is submitted via the home page 358. Logic 329 validates the request with data in the file 360. If the request is rejected, notice 359 is sent to subscriber. A request to install lessons is processed by logic 330 and updated lesson material is uploaded from the teacher's computer by logic 331 and stored in file 390. Logic 332 processes requests for student progress review and logic 333 retrieves data from file 360 and downloads the material to the teacher's computer. Logic 334 allows for future request options.

ADVANTAGES

From the description above, a number of advantages of my Reading Assistant become evident:

(a) A subscriber can access the program from any computer running any of the current operating systems that has internet access.

(b) All text-to-speech programs features are immediately available to the subscriber, upon his surrendering his token, from any computer and at any time.

(c) The service provides a one subscriber fee for service instead of the conventional one computer license fee for each computer provisioned.

(d) A wide variety of e-books, textbooks and lesson materials are available with synchronized renditions of text and audio versions of the material.

(e) Printed material, web based textual material, e-mail and computer documents can all be processed by the text-to-speech program.

(f) Each subscriber can choose a preferred reading rate and the system stores bookmarks for any book or lesson material that records the subscriber's reading progress in the material.

(g) Groups such as a class or a training group can all have access to teacher supplied assignments of reading materials and feedback to the teacher of the students' progress can be provided.

CONCLUSION, RAMIFICATIONS, AND SCOPE

Accordingly, the reader will see that the Reading Assistant provisions and activates text-to-speech programs in any subscriber utilized computer. These programs provide the subscriber with the capabilities of the text-to-speech program and local control of the program on any computer that proves convenient. Furthermore, the Reading Assistant has the additional advantage in that It is organized to cater to the requirements of groups including school classes or training groups because all subscribers interact at the initiation and completion of each reading session with the server via the internet. Subscribers can be associated with groups and gain access to lesson materials specifically organized for a particular group.

A teacher can develop a class lesson plan and execute it by providing the reading material through the server. The teacher can also monitor class progress by monitoring the statistics collected by the server.

While the above description contains many specificities, these should not be construed as limitations the scope of the invention but as merely providing illustrations of the presently preferred embodiments of this invention.

Thus the scope of the invention should be determined by the appended claims and their legal equivalents, and not by the examples given.

What is claimed is:

1. A system comprising:
   a. an electronically accessible computing server configured to allow a subscriber to locally control at least one electronically executable requested program using a subscriber-accessed apparatus, even when the subscriber-accessed apparatus is disconnected from the computing server;
   b. a plurality of unique subscriber accounts stored on the computing server, each account associated with a unique subscriber and comprising 1) unique subscriber authentication information and subscriber-accessed apparatus authentication information of the last subscriber-accessed apparatus from which the subscriber successfully logged onto the computing server, 2) a list of the subscriber's registered apparatuses, wherein the registered apparatuses do not have to be owned by the subscriber, 3) the subscriber's current status embodied, if active, in the subscriber's token, which is recorded on the computing server and configured to maintain the subscriber's status even when the subscriber is not connected to the computing server, and 4) the token's expiration time; and
   c. at least one electronically executable computing program that can be executed under local control by the subscriber-accessed apparatus;
   wherein the computing server is configured to
   1) manage the plurality of unique subscriber accounts;
   2) provide a pre-timed activation of the at least one electronically executable computing program only when the subscriber account corresponding to the subscriber authentication information included in the subscriber's request does not have an active token stored;
   3) record the subscriber's token indicating active system status when activation of the at least one electronically executable computing program is provided and, in the subscriber's account, record the token expiration time, which is synchronized to the activation expiration of the at least one electronically requested executable computing program;
   4) provision at least one electronically executable computing program with pre-timed de-installation instructions to the apparatus when the apparatus from which the request was sent is not in the subscriber's list of registered apparatuses; and
   5) delete the subscriber's token in the subscriber's account when the token's expiration time has been reached, thereby releasing the subscriber's token;
   wherein authorized subscribers are provided serial access from a plurality of computing apparatuses to their licensed computing software.

2. The system of claim 1, wherein the computing server is further configured to determine whether a subscriber-accessed apparatus from which a subscriber's request was sent is a registered or non registered apparatus.

3. The system of claim 1, wherein the token expiration time and activation expiration of the at least one electronically executable computing program are further synchronized with the pre-timed de-installation instructions of the at least one requested electronically executable computing program, when the apparatus from which the request was sent is not in the subscriber's list of registered apparatuses.

4. The system of claim 1, wherein the computing server is configured to provision at least one electronically executable computing program if the subscriber-accessed apparatus is logging onto the computing server for the first time as a registered apparatus.

5. The system of claim 1, wherein the computing server is configured, upon receiving a request from a subscriber-accessed apparatus, to extend the activation of at least one electronically executable computing program, to re-verify the subscriber's token and the subscriber-accessed apparatus from which the subscriber successfully logged onto the server and provision an extended pre-timed activation, or additionally extended-time de-installation instructions, depending on whether the subscriber-accessed apparatus is a registered or non-registered apparatus, and overwrite the previous pre-timed activation with a new pre-timed activation and, where the subscriber-accessed apparatus is a non-registered apparatus, overwrite the pre-timed de-installation instructions with new pre-timed de-installation instructions, and to update the token expiration time.

6. The system of claim 1 wherein the at least one executable computing program comprises one or more reading assistant learning resource programs selected from the following group:
   1) an Optical Character Recognition (OCR) program 2) a display program 3) a text-to-speech program, 4) a digital reader control program, 5) a dictionary program, 6) a thesaurus program, 7) a translation program.

7. The system of claim 1, wherein each of the plurality of unique subscriber accounts further includes a bookmark storage which is configured to store information the subscriber had previously been working on using at least one electronically executable computing program, and to record selected information along with the location in the content during which program assistance ended.

8. The system of claim 1, wherein each of the plurality of unique subscriber accounts further includes an e-Text library which is configured to store information comprising published and non-published material, available for review by a subscriber once a current computing program activation by the server has been established for the subscriber.

9. The system of claim 8, wherein the e-Text library is configured to allow storage of material as preprocessed speech code to alleviate processing requirements on the subscriber accessed apparatus.

10. The system of claim 7, wherein subscriber accounts associated with subscribers identified as group members additionally each comprise access rights to a lessons library stored on the computing server, which stores lesson material provided by one of said group members designated as a teacher, wherein the teacher is provided with privileges to: 1) view or download subscriber-selected session information stored in the bookmark storage of each one of the plurality of subscribers identified as group members and 2) transfer lesson material to the lessons library.

11. The system of claim 10, wherein the computing server is configured to, upon electronically receiving data the subscriber-accessed apparatus collected from the group member's at least one electronically executable computing program prior to expiration of the at least one electronically executable computing program's time-limited activation, store the data collected from the subscriber-accessed apparatus in the group member's bookmark storage.

12. The system of claim 1, further comprising a communications network connecting the computing server and the subscriber-accessed apparatus with each other at least during the subscriber's activation request and any subsequent program modification requests.

13. A method providing authorized subscribers serial access from a plurality of computing apparatuses to computing software, comprising the steps of:
 a. managing, on an electronically accessible computing server configured to allow a subscriber to locally control at least one electronically executable requested program, even when a subscriber-accessed apparatus is disconnected from the computing server, a plurality of unique subscriber accounts that each includes 1) unique subscriber authentication information and subscriber-accessed apparatus authentication information of the last apparatus from which the subscriber successfully logged onto the computing server, 2) a list of the subscriber's registered apparatuses, wherein the registered apparatuses do not have to be owned by the subscriber, 3) the subscriber's current status embodied, if active, in the subscriber's token, which is recorded on the computing server and configured to maintain the subscriber's status even when the subscriber is not connected to the computing server, and 4) the token's expiration time;
 b. managing, on the computing server, at least one electronically executable computing program that can be executed under local control by the subscriber-accessed apparatus;
 c. receiving, at the computing server, a request from the subscriber sent from the subscriber-accessed apparatus to activate at least one executable computing program; and
 d. processing the request from the subscriber by checking that the subscriber account corresponding to the subscriber's authentication information included in the request does not have an active token stored and, finding none, providing a pre-timed activation of requested the at least one electronically executable computing program;
 e. recording in the subscriber's account at the computing server the subscriber's token indicating current active system status when the at least one requested electronically executable computing program is activated and recording the token expiration time, which is synchronized to an expiration of the pre-timed activation of the at least one requested electronically executable computing program;
 f. provisioning at least one electronically executable computing program with pre-timed de-installation instructions to the apparatus when the apparatus from which the request was sent is not in the subscriber's list of registered apparatuses; and
 g. deleting, at the computing server, the subscriber's current activity in the subscriber's account when the token's expiration time has been reached, thereby releasing the subscriber's token.

14. The method of claim 13, further comprising determining whether the subscriber-accessed apparatus from which the subscriber's request was sent is a registered or non registered apparatus.

15. The method of claim 13, wherein the apparatus from which the request was sent is not in the subscriber's list of registered accessible apparatuses, and wherein the token expiration time and activation expiration of the at least one electronically executable computing program are further synchronized with the pre-timed de-installation instructions of the at least one requested electronically executable computing program.

16. The method of claim 13, further comprising a communications network connecting the computing server and the subscriber-accessed apparatus with each other, at least during the subscriber's activation request and any subsequent program modification requests.

17. The method of claim 13, further comprising provisioning at least one executable computing program after determining that the subscriber-accessed apparatus is logging onto the computing server for the first time as a registered apparatus.

18. The method of claim 13, wherein an executable computing program on the subscriber-accessed apparatus is configured, at a predetermined time preceding expiration of the time-limited activation, to:
 a. issue an alert to the subscriber of a pending activation expiration;
 b. cause the subscriber-accessed apparatus to reestablish connection with the computing server via the communications network as necessary and communicate with the computing server, sending to the computing server session information and causing the computing server to record the information in a section of the subscriber's account for storing the information as a bookmark;
 c. cause the computing server to process, upon request from the subscriber, an extended time request by re-verifying subscriber and accessed apparatus identity, providing to the subscriber an extended pre-timed activation and, where the subscriber-accessed apparatus is a non-registered apparatus, additionally extended-time de-installation instructions, and overwriting the previous pre-timed activation and, where the subscriber-accessed apparatus is a non-registered apparatus, the previous de-installation instructions;
 d. cause the computing server to update the token expiration time stored in the subscriber's current activity; and
 e. allow the subscriber, at any time before processing expiration, to communicate with the computing server to request an immediate expiration of the time-limited activation and, where the subscriber-accessed apparatus is a non-registered apparatus, immediate initiation of the de-installation instruction, and sending session information to be recorded as a bookmark and causing the computing server to respond after verifying the token and the subscriber-accessed apparatus authentication information to provide immediate de-activation instructions or immediate de-installation instructions and to delete the token from the subscriber's current activity.

19. The method of claim 18, wherein the plurality of executable computing programs comprise a comprehensive reading assistant learning resource and are each configured to, at a predetermined time preceding the expiration of the executable computing program, cause the subscriber-accessed apparatus to perform steps comprising:

a) collecting information from any executable computing programs activated by the computing server during the session, wherein the at least one executable computing program comprises one or more of the following reading assistant learning resource computing programs:

1) an Optical Character Recognition (OCR) program 2) a display program 3) a Text-To-Speech program, 4) a digital reading voice control program, 5) a dictionary program, 6) a thesaurus program, 7) a translation program; and b) causing the subscriber-accessed apparatus to reestablish connection with the computing server via the communications network as necessary and transmit the collected information to the computing server for storage within the subscriber's bookmark storage section of the subscriber's account.

20. The method of claim 13, wherein the at least one executable computing program can use any digital content as a source of material.

21. The method of claim 19, wherein the computing server can additionally provide spelling and grammar aids.

22. The method of claim 19, further comprising the steps of: a) providing storage on the computing server in a lessons library for multiple subscribers identified as members of a group, designating one of said group members as a teacher with privileges to view or download subscriber selected information stored in the bookmark storage of each of said group members subscriber's account and transfer reading material or testing material to the lessons library;

b) transferring from the computing server to the subscriber-accessed apparatus any subscriber-selected, teacher-designated lesson material; and c) transferring from the subscriber-accessed apparatus to the computing server and storing in the subscriber's bookmark storage, prior to the expiration of the time-limited activation, information connected with operation of any executable computing program and content associated with any subscriber-selected teacher designated lessons material generated in the session.

23. The method of claim 19, further comprising providing storage on the computing server for an e-Text library wherein each subscriber has a privilege to access published or non-published text material.

24. The method of claim 19, further comprising providing, in each of the plurality of unique subscriber accounts, a bookmark storage that stores information the subscriber had previously been working on using at least one electronically executable computing program and recording selected information along with the location in the content during which program assistance ended.

25. A computer-readable storage medium with an executable computer readable code embodied thereon, which, when executed by a server causes the said server to perform operations comprising:

a. managing, on an electronically accessible computing server configured to allow a subscriber to locally control at least one electronically executable requested program even when disconnected from the computing server, a plurality of unique subscriber accounts, each account associated with a unique subscriber and comprising 1) unique subscriber authentication information and apparatus authentication information of the last apparatus from which the subscriber successfully logged onto the server, 2) a list of the subscriber's registered apparatuses, wherein the registered apparatuses do not have to be owned by the subscriber, 3) the subscriber's current status embodied, if active, in the subscriber's token, which is recorded on the computing server and configured to maintain the subscriber's status even when the subscriber is not connected to the computing server, and 4) the token's expiration time;

b. managing, on the computing server, at least one electronically executable computing program that can be executed under local control by the subscriber-accessed apparatus;

c. receiving, at the computing server, a request from the subscriber sent from the subscriber-accessed apparatus to activate at least one electronically executable computing program, d. processing the request from the subscriber by checking that the subscriber's account corresponding to the subscriber's authentication information included in the request does not have an active token stored and, finding none, providing a pre-timed activation of the at least one electronically executable computing program and, when the apparatus is not in the subscriber's listings of registered apparatuses, further provisioning at least one executable computing program with pre-timed de-installation instructions;

e. recording, in the subscriber's account on the computing server, the subscriber's token indicating current active system status, when activation of the at least one requested electronically executable computing program occurs, and recording token expiration time which is synchronized to the activation expiration of the at least one requested electronically executable computing program; and f. deleting, at the computing server, the subscriber's token in the subscriber's account when the token's expiration time has been reached, thereby releasing the subscriber's token.

* * * * *

UNITED STATES PATENT AND TRADEMARK OFFICE
CERTIFICATE OF CORRECTION

PATENT NO. : 8,385,525 B2
APPLICATION NO. : 11/430859
DATED : February 26, 2013
INVENTOR(S) : Noah John Szczepanek It is certified that error appears in the above-identified patent and that said Letters Patent is hereby corrected as shown below:

Column 9: Claim 13, line 3, the end-of-line punctuation "." should read --:--; line 33 (Column 9, line 57), "requested the" should read --the requested--.

Signed and Sealed this
Second Day of April, 2013

Teresa Stanek Rea
*Acting Director of the United States Patent and Trademark Office*